United States Patent Office 2,966,406
Patented Dec. 27, 1960

2,966,406
PRODUCTION OF TUNGSTEN FROM TUNGSTEN OXIDES

Henri Louis Spier and Willem Lambertus Wanmaker, Eindhoven, Netherlands, assignors to North American Philips Company, Inc., New York, N.Y., a corporation of Delaware No Drawing. Filed June 6, 1958, Ser. No. 740,199

Claims priority, application Netherlands June 7, 1957

2 Claims. (Cl. 75—.5)

Our invention relates to the production of tungsten from tungsten oxides. More particularly, the method of our invention relates to the production of tungsten powder that is particularly suitable for the formation of non-sag filaments.

It is known to produce tungsten powder by heating at 800° C.–900° C. ammonium para-tungstate in a rotating furnace. In this method $WO_3$ is first produced. A "dope," such as potassium silicate is then added and a reduction with $H_2$ at 500° C. results in the formation of $W_4O_{11}$ and after a second reduction with $H_2$ at 775° C.–900° C. tungsten (W) is formed. This tungsten is washed with hydrogen fluoride (HF) and soaked in $Al(NO_3)_3$ and a third reduction with $H_2$ is carried out. The tungsten that is finally obtained is then mixed with tungsten powder produced without the use of a "dope," so called non-"doped" tungsten powder, and the non-sag filaments are produced from this mixture.

This process suffers from the fact that it is fairly complicated, requiring a multitude of steps and the control of the granular growth of the tungsten produced is very uncertain and difficult.

A principal object of this invention therefore, is to provide for a less complicated method for the reduction of tungsten compounds to tungsten.

Another object of this invention is to provide a method for reducing tungsten compounds to tungsten that involves fewer steps.

Still another object of the invention is to provide a method for reducing tungsten compounds to tungsten that permits better control of the tungsten produced.

These and other objects of the invention will be apparent from the description that follows.

According to our invention we have found that by use of a potassium silico-tungstate corresponding to the formula $K_4SiW_{12}O_{40}$ or its hydrate the production of tungsten powder by reduction of a tungsten compound is greatly simplified, the number of steps required is reduced to only one, and the control of the particle size of the tungsten produced is improved because of a more gradual formation of tungsten seeds.

The method of our invention is carried out by soaking a tungsten compound such as ammonium para-tungstate, sodium tungstate, tungstic acid, and other similar compounds with the $K_4SiW_{12}O_{40}$ dope and then reducing the tungsten-compound directly, without further processing, to tungsten by heating the doped tungsten-compound in the presence of $H_2$ at a temperature between 500° C. and 900° C.

It is preferred that aluminium nitrate $Al(NO_3)_3$ be added to the mixture of the tungstate and silicon compound in order to prevent the agglomeration of the tungsten powder produced.

It is further preferred that for each 100 g. of tungsten produced 4–4.5 g. of $K_4SiW_{12}O_{40}$ and 0.06–0.120 g. of $Al(NO_3)_3$ be used.

The method of our invention is illustrated in greater detail by the following specific example.

Example 100 grams of ammonium para-tungstate were mixed with 100 cc. of an aqueous solution of $K_4SiW_{12}O_{40}$ prepared by mixing 4.2 grams of the silico compound per liter of water. To this mixture 0.012 gram of aluminium nitrate were then added and all the ingredients thoroughly mixed. The water was then evaporated by heating in air at a temperature of 110° C. The dry mixture was then powdered and heated in a furnace at a temperature of 700° C. in a hydrogen atmosphere for 2 hours. A tungsten powder was produced having an average particle diameter of about $20.0/\mu$.

While we have described our invention in connection with specific embodiments and applications, other modifications thereof will be readily apparent to those skilled in this art without departing from the spirit and scope of the invention as defined in the appended claims.

What is claimed is:

1. The method of producing tungsten powder comprising the step, mixing 100 grams of a silico free tungsten compound selected from the group consisting of tungstic acid and the tungstates with about 4–4.5 g. of a potassium silico tungstate, the anhydrous form of which corresponds to the formula $K_4SiW_{12}O_{40}$, and a smaller amount of aluminum nitrate and heating said resultant mixture in a hydrogen atmosphere at a temperature of from about 500° C. to 900° C.

2. The method of producing tungsten powder comprising the step, mixing 100 grams of a silico free tungsten compound selected from the group consisting of tungstic acid and the tungstates with about 4–4.5 g. of a potassium silico tungstate, the anhydrous form of which corresponds to the formula $K_4SiW_{12}O_{40}$, and about 0.06 to 0.120 gram of aluminum nitrate and heating said resultant mixture in a hydrogen atmosphere at a temperature of from about 500° C. to 900° C.

References Cited in the file of this patent
UNITED STATES PATENTS

| | | |
|---|---|---|
| 1,558,000 | Fernburger | Oct. 20, 1925 |
| 2,077,873 | Braselton | Apr. 20, 1937 |

OTHER REFERENCES

Jacobson: Encyclopedia of Chemical Reactions, vol VI, Reinhold Publishing Corp., New York, 1956, page 131.